Dec. 16, 1958     C. H. CURREY ET AL     2,864,941
MONITORING APPARATUS

Filed Sept. 26, 1956     2 Sheets-Sheet 1

INVENTORS
CHARLES H. CURREY and
A. C. LEWIS BROWN
BY
Mason, Kolehmainen, Rathburn and Wyss
ATTORNEYS

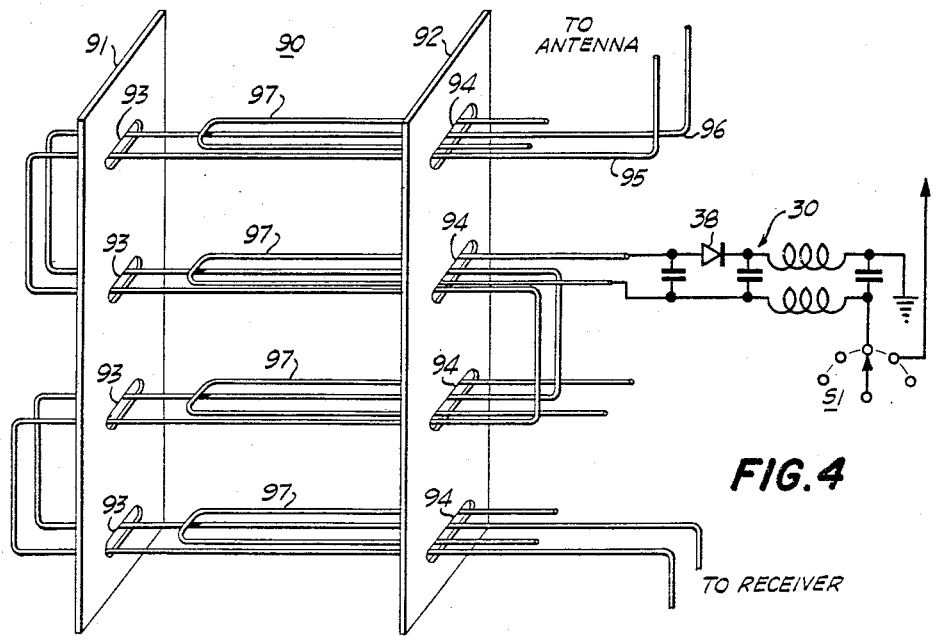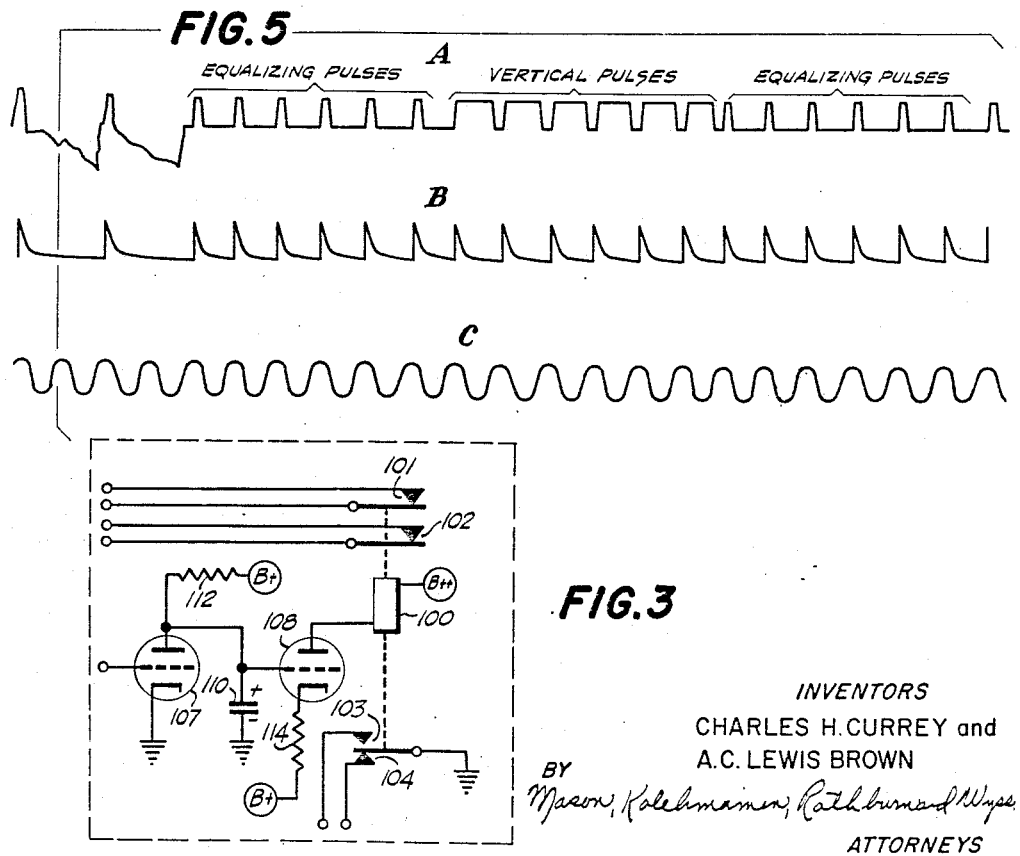

United States Patent Office 2,864,941
Patented Dec. 16, 1958

2,864,941

MONITORING APPARATUS

Charles H. Currey, Palatine, and Arthur Charles Lewis Brown, Evanston, Ill., assignors to A. C. Nielsen Company, Chicago, Ill., a corporation of Illinois Application September 26, 1956, Serial No. 612,124

18 Claims. (Cl. 250—2)

The present invention relates to monitoring apparatus and more particularly to such apparatus as is useful in monitoring the listening habits of television receiver users.

Heretofore, there have been disclosed numerous instrumented methods and apparatus for determining the listening habits of home television receiver users. Some such methods and apparatus are disclosed in a number of United States patents, including, for example, Patents 2,175,937; 2,305,834; 2,354,836; 2,439,201; 2,483,573; 2,484,733; 2,513,360; 2,552,585; 2,573,279; 2,618,694; 2,618,743; 2,630,366; and 2,630,367. Generally, such devices involve the use of a recorder or indicating device operating in conjunction with each receiver utilized in the home, which home is one of a group of selected homes in a sample of homes which is chosen to be representative of a typical audience in a particular area, or on a national scale, as the case may be. Such apparatus generally comprises facilities for driving a movable record receiving element such as movable paper tape, magnetic tape or wire, movable film or any other similar recording medium. The record receiving element is generally moved in a predetermined manner with respect to time and associated with it is equipment for applying to the record receiving element the necessary record representative of the tuning condition of a particular television or wave signal receiver or receivers with which the recording equipment is associated.

If the record receiving element moves in some predetermined relationship with respect to time, it will be apparent that there will be obtained a record with respect to time of the tuning condition of the associated receiver. Generally, some additional time information, as disclosed and claimed in United States Letters Patent No. 2,660,509 to Rusch is applied to the record receiving element as a check on the predetermined movement with respect to the time of the record receiving element and as a means of orientating the record obtained on the record receiving element with respect to time. The number of homes in the sample of homes representative of the radio or television audience may be varied, and a sufficient number will be chosen to produce an accurate sample which is representative of the class of listeners and viewers in the area under consideration. These homes are chosen on a basis whereby all variable factors, such, for example, as the number of potential listeners, economic affluence, religion, etc., which normally affect any process of sampling public opinion, are accounted for on a correctly weighted basis. Such instrumented methods have utilized a wide variety of apparatus all the way from relatively simple mechanical devices to much more complicated devices involving electromechanical as well as electronic elements. The more complicated arrangements have been necessitated by virtue of the complexity of the wave signal receivers being monitored, and also the difficulty and, in fact, impossibility in many cases of attaching simple means to receivers to be monitored for indicating the tuning condition thereof.

In recent years the televsion audience in the United States as well as elsewhere has increased by leaps and bounds, and the home television audience is becoming a larger and more important segment of the home wave signal receiver audience than is the home radio audience. In fact, in many urban centers the radio audience has been greatly reduced in recent years. Simple mechanical means for indicating the position of the tuning shaft of television receivers is complicated as compared to ordinary radio receivers by the fact that, in general, the tuning shafts of television receivers comprise the inner one of a pair of concentric shafts. Likewise, in order to prevent what is known as conditioning the sample, it is desirable that the collaborator's receiver which is being monitored is one owned by the collaborator, and to which is attached a suitable recording means. Obviously, the statistical choice of collaborator homes may require the monitoring of a large number of different types and kinds of receivers. This is a difficult problem when it is remembered that there are literally hundreds of different television receivers being manufactured today. Many of these receivers are expensive devices costing from hundreds of dollars to even more than a thousand dollars, and the collaborator is not very agreeable to permit the making of complicated changes or the addition of elaborate monitoring equipment with such a receiver. Consequently, it is desirable to provide instrumented means for indicating and recording the viewing habits of television receivers in view of their greatly increased popularity, which provides a minimum of equipment, which can be kept in a compact place, preferably within the cabinet of the receiver being monitored, which can be applied to the monitored receiver in a very simple manner without in any way interfering or requiring substantial changes in the receiver itself, and which is foolproof in operation, producing a continuous record of the tuning condition of the particular receiver, or, in the case of multi-receiver homes, a record of the tuning condition of several receivers.

The present invention is concerned primarily with an improved arrangement for modulating the incoming signal to a wave signal receiver by means of a selective device and sensing this modulation by a circuit connected at some point in the wave signal receiver following the receiver circuits. In a copending application of Robert L. Freeman, Serial No. 374,593, filed August 17, 1953, which is assigned to the same assignee as the present invention, there is disclosed and claimed an arrangement wherein a modulation component is applied by means of an absorption modulator to the incoming signal of a wave signal receiver. Several modulating arrangements for bleeding energy from the incoming signal and detecting this modification of the incoming signal when there is frequency coincidence between the resonant frequency of the absorption modulator and the incoming signal are disclosed in this Freeman application. The disclosed modulating arrangements produce an innocuous modulation by virtue of the choice of the modulating frequency applied, or, if not innocuous, use is made of lockout means to render the modulating means ineffective as soon as the channel to which the receiver is tuned has been determined. The Freeman application also discloses, in the case of monitoring a television receiver, that the absence of the horizontal synchronizing pulses during a receiver re-tuning operation could be employed to recycle the metering equipment, or, in other words, to render the lockout means ineffective.

It would be desirable to provide an arrangement in which no separate source of modulation components is necessary and wherein some component of the incoming television signal may be utilized to apply a modulation component to a later incoming signal. In a copending application of Stephen F. Bushman, Serial No. 374,761, filed August 17, 1953, which is assigned to the same assignee as the present invention, the lockout means of the Freeman application is eliminated and the system is simplified by employing the back porch or pedestal of the television signal as the location of a modulating signal which is impressed on the received wave. Although the circuit described in the Bushman application operates satisfactorily, it would be desirable to provide a monitoring arrangement which would be equally applicable for use with color as well as black and white television receivers. Obviously, since the back porch is the location of the burst signal in a composite color television signal, the modulation component which is used for monitoring purposes cannot also be positioned on the back porch. Moreover, it would be desirable to provide a system which does not employ a variably tuned circuit modulator which is inherently susceptible to misadjustment during extended use.

Accordingly, it is an object of the present invention to provide a new and improved apparatus and system for determining the listening and viewing habits of television receiver users.

Another object of the present invention is to provide an arrangement for monitoring television receivers wherein a modulation component is applied to a portion of the incoming television signal in such manner that it in no way impairs the reproduction of the televised image.

A further object of the present invention is to provide an arrangement for monitoring television receivers which utilize a component of the horizontal synchronizing pulses to modulate the incoming signal to determine the tuning condition of the television receiver.

Still another object of the present invention is to provide a system and apparatus for monitoring either monochromatic or polychromatic receiver use.

Further objects and advantages of the present invention will become apparent as the following following description proceeds, and the features of novelty which characterize the invention will be pointed out with particularity in the claims annexed to and forming a part of this specification.

For a better understanding of the present invention reference may be had to the accompanying drawings, in which:

Fig. 3 is a schematic circuit diagram of a relay circuit which may be substituted for a relay circuit which is included in the circuitry of Fig. 2;

Fig. 4 is a transmission line and modulation unit embodying certain aspects of the present invention and finding particular utility in the system shown in Figs. 1 and 2; and Fig. 5 comprises a series of waveforms illustrating signals appearing at various points in the circuit shown in Fig. 2.

Very briefly, the above and further objects are realized in accordance with the present invention by providing apparatus including a plurality of tuned circuits respectively calibrated to the video carrier frequencies of the transmitting stations whose programs are to be monitored which are coupled to a transmission line connected between the television receiving antenna or antennae and the radio frequency input terminals of the television receiver. A unidirectional impedance device or switching diode is associated with each of the tuned circuits and these diodes are sequentially rendered conductive by a scanning device to effectively apply a resistive shunt to the associated tuned circuit to render it non-absorptive. When, however, the diodes are nonconductive the associated tuned circuits are conditioned for absorbing energy of the related frequencies from the corresponding television signal supplied by the transmission line to the receiver.

In order to determine the station or channel to which the television receiver is tuned, an alternating voltage of a predetermined frequency is sequentially applied to each of the tuned circuits by the scanning means so that when this signal is impressed upon the tuned circuit which corresponds to the video carrier frequency of the channel which is tuned in by the television receiver, the diode in this tuned circuit provides a number of signal components in the receiver modulated in accordance with the said predetermined frequency. One such signal component is the synchronizing pulses which, in conventional receivers, appear at the output of the second detector. The detection of this predetermined frequency signal in the horizontal synchronizing pulses arrests operation of the scanning means in a position associated with the particular tuned circuit to which the predetermined modulating signal is supplied, and this arrested position of the scanning means is used to control the operation of a suitable recorder for providing a record of the channel to which the receiver is tuned.

Figure 1:
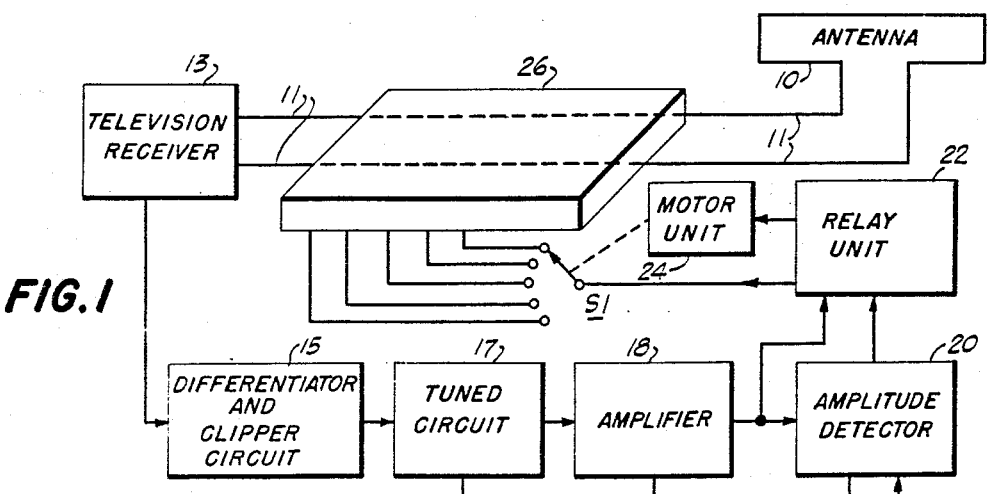
Fig. 1 is a block diagram of a monitoring system incorporating the present invention.

Referring now to Fig. 1, the composite television signals from a number of different transmitting stations are received by an antenna system 10 and coupled via a suitable twin type transmission line 11 to the high frequency input terminals of a television receiver 13 wherein the received signals are selected, amplified, and utilized to reproduce a selected one of the received televised programs. In accord with present-day television standards, each of the received television signals contains, in addition to the audio and video information, a video carrier which is amplitude modulated by horizontal synchronizing pulses, vertical synchronizing pulses, and equalizing pulses. These three types of synchronizing pulses all appear in the detected signal which is supplied from the second detector of the television receiver to the synchronizing signal separator. In accordance with an important aspect of this invention, these synchronizing signals serve a multiple purpose in monitoring the use of the television receiver 13. First, they are used in indicating the channel to which the receiver is tuned; second, they are instrumental in the development of the modulating signal of a predetermined frequency which selectively modulates the plurality of signals transmitted over the transmission line 11 from the antenna 10 to the television receiver 13; and third, they indicate whenever the receiver 13 is re-tuned.

A portion of the synchronizing pulse signal shown as a waveform A in Fig. 5 may be extracted from the output of the second detector of the receiver 13 and supplied to a differentiator and clipper circuit 15 to provide a waveform B as also shown in Fig. 5. This waveform is a train of narrow, positive going pulses or spikes corresponding in time to the positive going portions of the synchronizing signal shown in waveform A. The signal of waveform B from the circuit 15 is coupled to a tuned circuit 17 which, in the hunting or scanning condition of the system, is preferably tuned to one-half of the repetition rate of the horizontal synchronizing pulses or 7.875 kilocycles. It will be understood by those skilled in the art that the repetition rate of the horizontal synchronizing pulses is the line frequency. The tuned circuit 17 under certain conditions to be described more fully hereinafter provides a sinusoidal wave output which is amplified in an amplifier 18 and supplied to an amplitude detector 20 to provide a control signal for a relay 22 which selectively energizes a motor unit 24.

A portion of the output signal from the amplifier 18 is also coupled through suitable contacts of the relay unit 22 and a motor driven scanning device commutator or selector switch S1 to a modulation unit 26. The circuitry is so arranged that during "hunting" the motor 24 is energized and a portion of the output signal of the amplifier 18 is connected to the wiper of the switch S1. Accordingly, the output signal from the amplifier 18 is selectively applied to each of the contacts of the switch S1, which contacts are each respectively connected to one of a plurality of tuned circuits including switching diodes in the modulation unit 26. These tuned circuits are respectively tuned to the carrier frequencies of a plurality of transmitting stations to be monitored and, therefore, the output signal from the amplifier 18 sequentially and selectively modulate the signals supplied to the television receiver 13. It may thus be seen that when the wiper of the switch S1 is connected to the contact which corresponds to the channel tuned in by the receiver 13, a feedback path from the amplifier 18 is completed through the relay unit 22, the switch S1, the modulating network 26, the television receiver 13, the differentiator and clipper circuit 15 and the tuned circuit 17. Since the amplifier 18 has a gain greater than the loop loss, the system oscillates, which oscillations build up until the energy appearing at the output of the amplifier 18 is sufficient to release the relay unit 22, thereby to deenergize the motor 24 and to disconnect the output signal of the amplifier 18 from the switch S1. The hunting or scanning cycle is thus completed. Since the oscillations build up and the motor 24 is deenergized before the wiper of the switch S1 is moved to the next succeeding contact, the position of the wiper is indicative of the channel to which the receiver 13 is then tuned. In addition to performing the above functions, the relay unit 22 also adjusts the resonant frequency of the tuned circuit 17 to an even multiple of the line frequency such as, for example, 31.50 kilocycles. The horizontal sync pulses from the receiver 13 which are differentiated and clipped in the circuit 15 are thus supplied to the tuned circuit 17 to provide a sinusoidal wave as shown in Fig. 5C, which wave is amplified by the amplifier 18 to maintain the relay unit 22 in its released condition, in which no signal is coupled to the modulation unit 26 and the motor 24 is deenergized.

At some later time, when the television receiver is retuned, there is a momentary period during which no horizontal synchronizing pulses are received; consequently, the energy supplied from the amplifier 18 is also diminished causing the relay unit 22 to be operated, thereby energizing the motor 24, coupling the output of the amplifier 18 to the switch S1, and retuning the tuned circuit 17 to one-half the line frequency. The system is thus in the hunting or scanning condition and functions in the previously described manner until the wiper of the switch S1 reaches the contact corresponding to the channel to which the television receiver 13 has been re-tuned. The system then switches to the lockout condition. Similarly, if the receiver 13 is deenergized while the system is locked out, the relay unit 22 is released and when the set is again energized, the relay tube conducts and throws the system to the hunting condition before any negative voltage can build up.

Figure 2:
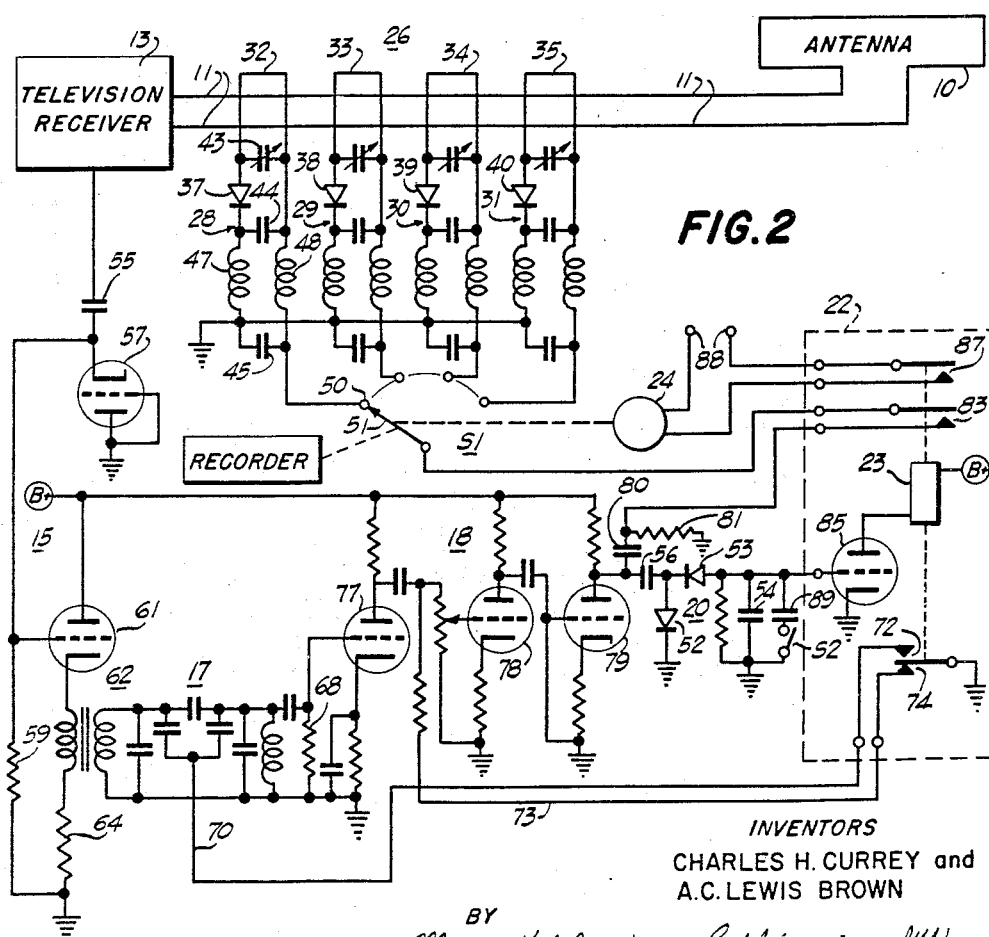
Fig. 2 is a schematic circuit diagram of the system of Fig. 1.

Referring now to Fig. 2 for a more detailed consideration of a circuit arrangement suitable for use in the system described above in connection with Fig. 1, it may be seen that the modulation unit 26 comprises a plurality of tuned circuits 28, 29, 30 and 31, which are each respectively tuned to a different one of the video carrier frequencies of the stations to be monitored. The tuned circuits 28, 29, 30 and 31 are each magnetically coupled to the transmission line 11 by means of a plurality of conductive loops 32, 33, 34 and 35. These conductive loops which are magnetically coupled to the transmission line 11 are part of the tuned circuits 28, 29, 30 and 31 and each include one of a plurality of unidirectional impedance devices or switching diodes 37, 38, 39 and 40. Inasmuch as each of the tuned circuits and associated apparatus are identical, only the tuned circuit 28 is described in detail, it being understood that the only difference between the tuned circuit 28 and the others is in the frequency to which it is calibrated.

As shown, the tuned circuit 28 includes a plurality of capacitors 43, 44 and 45 and a pair of radio-frequency chokes 47 and 48. One of a plurality of contacts 50 on the commutator switch S1 is connected to the junction of the capacitor 45 and the choke 48, and the junction of the capacitor 45 and the choke 47 is connected to ground. When the diode 37 is conducting, only a negligible amount of energy may be absorbed by the tuned circuit 28 due to the relatively low resistance shunt across the circuit 28 provided by the diode 37. When the diode 37 is nonconductive, the tuned circuit 28 absorbs energy of the carrier frequency to which the circuit is tuned from the signals supplied to the receiver 13. If this absorbed frequency signal is the signal which is tuned in by the receiver 13, an oscillation loop for the monitoring attachment is completed through the receiver 13 and the system goes into oscillation, thereby to release the relay unit 22.

The synchronizing signals from the second detector of the receiver 13 are coupled through a capacitor 55 and across a clipper 57 and a resistor 59 to the control grid of a triode 61. The values of the capacitor 55 and of the resistor 59 are selected such that these elements comprise a differentiating circuit which operates in conjunction with the negative pulse clipper 57 to provide a waveform of positive going spikes occurring at the line frequency of 15.570 kilocycles. Since the triode 61 is connected as a cathode follower, having an output transformer 62 serially connected with a resistor 64 between its cathode and ground, a high impedance circuit is provided for driving the tuned circuit 17.

The tuned circuit 17 includes components having various reactance values such that, when a conductor 70 is connected to ground, there is provided across an output resistor 68 a sinusoidal wave of oscillation having a frequency of 7.875 kilocycles. A frequency of four times that amount, or 31.50 kilocycles, is provided when the conductor 70 is "floating" or disconnected from ground. In the hunting condition of the monitoring system, a relay 23 in the unit 22 is operated to close a pair of contacts 72, thereby to ground the conductor 70 and to tune the circuit 17 to one-half the line frequency. When the relay 23 is released in the lockout condition of the monitoring system, the contacts 72 open to tune the circuit 17 to twice the line frequency.

The sinusoidal wave, which is developed across the resistor 68, is amplified in the cascade coupled amplifier 18, which includes the triodes 77, 78 and 79 to provide an output voltage wave between the anode of the triode 79 and ground which is, for practical purposes, a square wave. This amplified signal is coupled from the anode of the triode 79 through a capacitor 80 and across a resistor 81 to a pair of contacts 83 on the relay 23. As set forth above, the relay 23 is operated in the hunting condition of the system so that the output from the amplifier 18 is coupled directly to a wiper arm 51 of the motor driven commutator switch S1 in this condition of the system.

When the wiper arm 51 is connected to a contact which is not connected to the one of the tuned circuits 28—31 corresponding to the signal which is tuned in by the receiver 13, the related incoming carrier frequency signal could be modulated but there is no feedback provided through the modulation unit 26 and the television receiver 13 and the system does not oscillate. When, however, the wiper 51 is advanced by the motor unit 24 to engage a contact which is connected to the tuned circuit having the resonant frequency of the video carrier wave to which the television receiver 13 is tuned, the output signal from the amplifier 18 alternately renders the diode in this tuned circuit conductive and nonconductive to modulate the related incoming signal, and this modulation causes a corresponding variation in the amplitude of the horizontal sync pulses which are supplied in a differentiated condition to the cathode follower triode 61 thereby not only to sustain but to built up oscillations in the system.

To terminate the scanning or hunting condition and to place the system in a lockout condition, the output signal from the triode 79 continues to build up until it is of sufficient magnitude that, when detected in the detector 20, it provides a high unidirectional voltage which cuts off a relay control triode 85, thereby releasing the relay 23. The detector 20 includes a rectifier 52 for clipping positive going oscillations and a rectifier 53 for selectively charging condenser 54 from negative going oscillations supplied from the output of the triode 79 through a coupling condenser 56. During the hunting operation, the triode 85, whose grid is effectively at ground-potential, conducts heavily to hold the relay 23 operated. However, when the commutator switch S1 is adjusted to a position corresponding to the tuning condition of the receiver 13, the system goes into oscillation, as described above, and the condenser 54 is provided with a negative charge by the rectifier 53. When this negative charge or voltage attains a predetermined magnitude, as determined by the voltage output from the triode 79 and the time constant of the charging circuit for the condenser 54, the tube 85 is cut off to release the relay 23. When the relay 23 drops out, the contacts 83 open to prevent any further modulation of the received television signals. Also, when the relay 23 drops out, the normal open contacts 72 are opened and a pair of contacts 74 are closed. Opening the contacts 72 disconnects the conductor 70 from ground to tune the circuit 17 to twice the line frequency so that differentiated horizontal synchronizing pulses are amplified in the amplifier 18 to maintain the relay 23 in a released condition. Closing the contacts 74 grounds a conductor 73 to reduce the gain of the cascade amplifier 18 in the lockout condition of the system. As shown, the relay 23 is also provided with a pair of contacts 87 which are serially connected with the motor 24 across a pair of power line terminals 88 so that when the relay 23 drops out the contacts 87 open to deenergize the motor 24 with the wiper 51 engaging the contact corresponding to the channel to which the receiver 13 is tuned. Consequently, when the system is locked out the position of the wiper arm 51 is indicative of the tuning condition of the receiver 13.

Consider now the reason for tuning the circuit 17 to one-half the line frequency during hunting and twice the line frequency or any other even multiple of the line frequency during the lockout condition. In order to utilize the variation in amplitude of the horizontal synchronizing pulses to detect the signal of predetermined frequency which is modulated on the received signal by the modulation unit 26, it is important that the predetermined frequency be something other than the line frequency or its harmonics so that the horizontal synchronizing pulses themselves are not passed by the tuned circuit 17, otherwise, of course, the relay 23 would release as soon as the receiver 13 was tuned to a receivable station. To avoid this condition while at the same time taking advantage of the selectivity of the synchronizing circuits of the television receiver 13 to pass synchronizing signals and certain sub-multiples thereof, a frequency of one-half the line frequency is chosen. At this frequency, neither the horizontal sync pulses nor the equalizing or vertical pulses can excite the tuned circuit 17 into oscillation and, therefore, no false stopping is effected.

The tuned circuit 17 is tuned during the lockout condition to an even multiple of the line frequency and not to the line frequency or an odd harmonic thereof so that the equalizing and vertical synchronizing portions of the synchronizing signal, which occur at twice the line frequency, will not be sensed by the system as a re-tune of the receiver, thereby to send the system into a hunting condition. Referring to the waveforms of Fig. 5, it will be seen that the curve "A" is a portion of a composite monochromatic television signal showing, particularly, the equalizing and vertical synchronizing pulses which are utilized in an interlaced scanning system. It will be observed that the equalizing pulses and the vertical synchronizing pulses occur at twice the line frequency. Consequently, due to the differentiating and clipping action of the differentiator and clipper circuit 15, during the vertical retrace interval positive pulses of voltage are supplied to the tuned circuit 17 at a rate of twice the line frequency. If, therefore, the tuned circuit 17 were tuned to the line frequency during lockout, these pulses would tend to cause the relay 23 to be actuated and send the system into a hunting condition since the positive going pulses from the clipper 15 would occur every one-half cycle of the resonant frequency of the tuned circuit 17. Those pulses thus occur during the negative half cycle of the sinusoidal output wave of the tuned circuit 17 would reduce the energy supplied to the amplifier 18, and this reduction in output energy would possibly be interpreted by the system to indicate a change in the receiver tuning. Obviously, this would be undesirable. However, by operating the tuned circuit 17 at twice the line frequency during the lockout condition the pulses from the cathode follower 61 occur only at the positive going portion of the oscillation wave from the tuned circuit 17 thereby continuously adding energy to such wave and thus maintaining the relay 23 dropped out.

So as to insure detection of every change in receiver tuning while permitting the relay 23 to be dropped out for a sufficient time for the system to change over from the hunting to a lockout condition, it is important that relay 23 have a fast operate time. Also, a capacitor 89 is adapted to be selectively connected across the input of the tube 85 by a switch S2 to adjust the immunity of the circuit to spurious responses. More specifically, when the receiver 13 is re-tuned, the horizontal synchronizing pulses which are differentiated and supplied to the clipper 61 are interrupted for a very short time, which in some cases may be a fraction of a second. Consequently, it is important that the relay 23 operate during the interval that the channel selector switch of the receiver 13 is moved from one position to the next. If the relay 23 does not operate during this brief period, the horizontal synchronizing pulses of the newly tuned-in signal will hold the relay 23 released, and the change in receiver tuning will be missed. The relay 23 must also be adjusted such that the contacts 72 open before the contacts 83 are open so that no break occurs in the energy supplied to the relay 23.

In the event that it is deemed expedient to use an ordinary relay having the same operate and release times, the relay circuit of Fig. 3 may be used in place of the relay circuit 22 of Fig. 2. In the circuit of Fig. 3, the relay which is provided therein and which is designated 100 has two pairs of normally closed contacts 101 and 102, a pair of normally open contacts 103 and a pair of normally closed contacts 104. It should be noted that the contacts 101 and 102 correspond respectively to contacts 83 and 87 of the relay 23, that the normally closed contacts 104 correspond to the normally open contacts 72 of the relay 23, and that the normally open contacts 103 correspond to the normally closed contacts 74 of the relay 23. Therefore, the relay 100 must be, and is, so connected into the monitoring system that it is operated in the lockout condition and released in the hunting condition. This is the opposite to the manner in which the relay 23 in Fig. 2 is energized.

The output signal from the detector 20 in the circuit of Fig. 2 is coupled to the control grid of a triode 107, the output of which is coupled to and amplified by a second triode 108 which controls the energization of the relay 100. As shown, a capacitor 110 is connected between the control grid of the tube 108 and ground, that grid being connected directly to the anode of the triode 107. Moreover, a relatively high magnitude anode resistor 112 is connected between the anode of the triode 107 and a suitable source of B+ voltage, and the cathode of the triode 108 is connected through a suitable resistor 114 of relatively low value to the same B+ voltage. When the system is in a lockout condition, the triode 107 is held cut off by the negative voltage which is supplied thereto from the detector 120, as described above, so that the capacitor 110 is charged to the B+ voltage. Since the grid and cathode of the triode 108 are both at B+ voltage, triode 108 is rendered conductive and the relay 100 is then normally operated since it is connected to a higher B++ voltage. With the relay 100 in its operated condition, both pairs of contacts 101 and 102 are open so that the motor 24 is deenergized and the wiper of the commutator switch S1 is "floating."

When the tuning condition of the television receiver 13 is changed, the positive going pulse of voltage of short duration which appears in the output of the detector 20 causes the triode 107 to conduct momentarily. The time of this conduction may be, for example, of the order of one millisecond. When this occurs, the capacitor 110 is quickly discharged thereby cutting off the triode 108 which interrupts the current to the coil of the relay 100. Since most commercially available relays suitable for inclusion in the present monitoring system have a release time of the order of ten to fifteen milliseconds, the one millisecond cut-off of the triode 108 would not be sufficient to enable the relay 100 to drop out. However, when the triode 107 again becomes nonconductive the tube 108 remains cut off because the capacitor 110 must charge up to some predetermined value before the negative bias is overcome. The time constant of the circuit including the capacitor 110 and the resistor 112 is selected to be sufficiently long that the relay 100 fully releases before the voltage across the capacitor 110 increases to a sufficient value to fire the tube 108. There is thus provided the fast drop-out which is required in the circuit of Fig. 2 to permit the system quickly to change from the lockout to the hunting condition so that all of the changes in the tuning of the receiver 13 are recorded.

Referring to Fig. 4, there is shown modulation apparatus which may be used in conjunction with the system shown in Figs. 1, 2 and 3 for inductively coupling the tuned circuits 28, 29, 30 and 31 to the transmission line 11. The modulation apparatus 90 comprises a pair of spaced insulating support panels 91 and 92, each having a plurality of spaced slots 93 and 94. The slots 93 extend transversely to the principal axes of the associated panels 91, 92, and a pair of conductors 95 and 96, suitably providing a 300 ohm transmission line which extends through the slots 93 and are thus supported in parallel relationship by the panels 91 and 92. The unit 90 and specifically the conductors 95 and 96 are connected in the transmission line 11 of Figs. 1 and 2 between the receiver 13 and the antenna 10.

The conductors 95 and 96 are maintained in a parallel condition with respect to one another throughout the unit 90 and are interwound, as shown, through the slots 93 and 94 so as to provide a transmission line having three reverse bends therein with the ends of both conductors 95 and 96 extending outwardly from the same side of the panel 92 respectively at the top and bottom thereof. A plurality of U-shaped conductive members 97 are positioned in the slots 94 and spaced from the conductor 96. Each of the loops 97 may be connected respectively to the tuned circuits of the type shown in Fig. 2, and by way of example, the second from the top loop 97 is shown as being coupled to the tuned circuit 30, which includes the diode 39. As shown in Fig. 4, the tuned circuit is connected to one of the contacts of the commutator switch S1. The other loops 97 will ordinarily be connected to similar tuned circuits which are connected respectively to the other contacts of the switch S1 so as to provide a modulator similar to the modulator 26, as shown in Fig. 2.

In a reduction to practice of the modulation apparatus 90, the spacing of the transmission line conductors 95 and 96 is maintained on ⅜ inch centers and the diameter of each of these conductors is 0.081 inch so as not to disturb the characteristic impedance of the antenna-receiver transmission line from the usual value of 300 ohms. The loops 97 are also formed of 0.081 inch copper wire with a center-to-center spacing of ⅜ inch, the length of the loops 97 is five inches for the frequency of 54 to 88 megacycles, two inches for the frequency range 174 to 216 megacycles, and one-half inch for the frequency range of 475 to 875 megacycles, the loop 97 in the latter case being cut from a solid block of ⅛ inch thick copper. Also, the clearance between the loops 97 and the transmission line conductors 95 and 96 is 1/16 inch or less for all frequency ranges.

The present invention thus provides a monitoring system and apparatus which is particularly useful in monitoring the listening habits of the users of television receivers both of the monochromatic and polychromatic type.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent of the United States is:

1. Apparatus for monitoring the listening habits of television receiver users, comprising, a receiver attachment, a signal link interconnecting said attachment and said receiver, a frequency responsive amplifier circuit in said attachment, said amplifier circuit being connected to be energized by a signal from said signal link, a plurality of tuned circuits coupled to the input of said receiver, said tuned circuits being respectively tuned to different ones of a plurality of different frequencies corresponding to the carrier frequencies of signals receivable by said receiver, a commutator for selectively connecting the output signal from said amplifier circuit to said tuned circuits, a plurality of diode means connected respectively in each of said tuned circuits for periodically short-circuiting said tuned circuits in response to an oscillation wave supplied thereto from said tuned circuit, motor means for driving said commutator, and relay means responsive to an output signal from said amplifier circuit for controlling the energization of said motor and for selectively tuning said amplifier circuit to one of a plurality of predetermined frequencies, one of said frequencies being an even multiple of the line frequency of said television receiver.

2. Apparatus for monitoring the listening habits of television receiver users, comprising, a receiver attachment, a signal link interconnecting said attachment and said receiver, a tuned circuit in said attachment, said tuned circuit being connected to be energized with a signal from said signal link, a plurality of tuned circuits coupled to the input of said receiver, said tuned circuits being respectively tuned to different ones of a plurality of different frequencies corresponding to the carrier frequencies of signals receivable by said receiver, an amplifier connected to amplify the output of said first tuned circuit, a commutator switch for selectively connecting the output signal from said amplifier to said tuned circuits, motor means for driving said commutator, a plurality of diode means connected respectively in each of said tuned circuits for periodically short-circuiting said tuned circuits in response to an oscillation wave supplied thereto from said amplifier, and switching means responsive to an output signal from said amplifier for controlling the energization of said motor and for selectively tuning said first named tuned circuit to one of two predetermined frequencies, one of said frequencies being an even multiple of the line frequency of said television receiver, and the other being a frequency other than the line frequency or an even harmonic thereof.

3. Apparatus for determining the listening habit of wave signal receiver users, comprising, a transmission line connected between a receiving antenna and the high frequency input of said receiver, a plurality of tuned circuits, a plurality of inductive means each coupling a respective one of said tuned circuits to said transmission lines, a plurality of unidirectional impedance means respectively connected to said tuned circuits and operatively responsive to a predetermined signal supplied thereto for rendering the associated ones of said tuned circuits operative to absorb energy from said transmission line, and motor driven switch means for selectively coupling said predetermined signal from said receiver to said unidirectional impedance means.

4. In a monitoring system of the type associated with wave signal receivers having a receiving antenna, an antenna receiver transmission line, a plurality of tuned circuits, each of said tuned circuits being calibrated to a different predetermined frequency, means for inductively and simultaneously coupling all of said tuned circuits to said transmission line, and means for selectively rendering said tuned circuits operative to reduce the energy transmitted by said transmission line from said antenna to said receiver.

5. Apparatus for monitoring the listening habits of wave signal receiver users, comprising tuned circuit amplifier means separate from said receiver, means for selectively completing a regenerative feedback path for said amplifier means through said receiver to cause oscillation, and means for supplying at least a portion of the output of said amplifier means to a circuit means for detecting and indicating when said oscillation occurs.

6. Monitoring apparatus for a television receiver of the type including a receiving antenna connected via a transmission line to said receiver, comprising a receiver attachment including an amplifier, means for supplying the sweep synchronizing signals from said receiver to said attachment, a frequency selective coupling network for supplying said synchronizing signals to said amplifier, means for selectively and sequentially modulating the output signal from said amplifier on each of a plurality of signals received by said antenna and coupled to said receiver, and tuning condition indicating means responsive to said output signal reaching a predetermined level for indicating the station or channel to which said receiver is tuned.

7. Monitoring apparatus for a television receiver of the type including a receiving antenna connected via a transmission line to said receiver, comprising a receiver attachment including an amplifier, means for supplying the sweep synchronizing signals from said receiver to said attachment, a differentiator and polarizing circuit to which said synchronizing signals are supplied, a frequency selective coupling network for supplying the differentiated and polarized synchronizing signals to said amplifier, motor driven modulator means coupled to said transmission line for selectively and sequentially modulating the output signal from said amplifier on each of a plurality of signals received by said antenna and coupled to said receiver, and tuning condition indicating means responsive to said output signal having a predetermined level for indicating the station or channel to which said receiver is tuned, for deenergizing said motor and for interrupting the connection between said amplifier and said modulator means.

8. A monitoring system for a wave signal receiver, comprising a receiver attachment separate from said receiver, means for supplying a received signal from said receiver to said attachment, a frequency selective amplifier in said attachment for amplifying said signal, means for selectively modulating said amplified signal on a plurality of signals received by said receiver, whereby an oscillation circuit including said receiver and said amplifier is established when said amplified signal is modulated on the received signal which is tuned in by said receiver, and means responsive to oscillation of said oscillation circuit for performing a control function.

9. The system set forth in claim 8 wherein said amplified signal is sequentially and selectively modulated on said plurality of signals.

10. The system set forth in claim 8 wherein the frequency to which said amplifier is tuned is substantially altered when said oscillation circuit is completed.

11. A monitoring system for determining the listening habits of wave signal receiver users, comprising a receiver attachment including a modulation unit coupled to an input transmission line of said receiver, said unit including a plurality of loops formed of conductive material, support means for mounting said loops at spaced apart locations and means for supporting said transmission line in close proximity to but physically spaced from said loops.

12. In a monitoring system comprising a receiver attachment having two possible conditions of operation, one of said conditions being a hunting condition in which the station to which said receiver is tuned is located, and the other of said conditions being a lockout condition in which the station to which said receiver is tuned is indicated, tuned circuit means in said attachment responsive to a signal of predetermined frequency from said receiver for switching said system to the lockout condition, and means in said attachment responsive to an absence of a signal of different frequency from said receiver for switching said system to the hunting condition, said last named means including an integrator for delaying the switching to the hunting condition thereby to render the system relatively non-responsive to intermittent noise.

13. In a monitoring system of the type associated with wave signal receivers having a receiving antenna, the combination of a transmission line for connecting said antenna to the radio frequency input of said receiver, a plurality of tuned circuits each calibrated to a different predetermined frequency and each including inductive means continuously coupled to said transmission line, each of said predetermined frequencies being substantially equal to the carrier wave frequency of signals receivable by said antenna and tunable by said receiver, and means selectively rendering said tuned circuits operative to reduce the amplitude of the signal coupled from said antenna to said receiver when said receiver and the operative one of said tuned circuits are tuned to the same frequency.

14. The combination set forth in claim 12 wherein said receiver is a television receiver and said predetermined frequency is a submultiple of the line frequency of said receiver.

15. The combination set forth in claim 14 wherein said different frequency is an even harmonic of said line frequency.

16. Monitoring apparatus for a wave signal receiver, comprising a receiver attachment separate from said receiver, said attachment including an amplifier, a regenerative feed-back path for said amplifier through at least a portion of said receiver, said feedback path including a tunable radio frequency circuit of said receiver and variable tuned circuit means selectively tunable to a plurality of radio frequency signals to which said radio frequency circuit may be tuned, whereby said feedback path has a minimum impedance when said tunable radio frequency circuit and said tuned circuit means are tuned to the same frequency, and means responsive to an output signal from said amplifier for effecting a control function.

17. Monitoring apparatus as set forth in claim 16 wherein said control function comprises indicating the tuning condition of said tuned circuit means when said output signal has a predetermined value.

18. A monitoring system for determining the listening habits of wave signal receiver users, comprising a tuning condition indicating circuit having two possible conditions of operation, one of said conditions being a hunting condition in which the station to which said receiver is tuned is located, and the other of said conditions being a lockout condition in which the station to which said receiver is tuned is indicated, frequency selector means responsive while in a hunting condition to a signal of predetermined frequency from said receiver for causing said circuit to switch to a lockout condition and responsive while in a lockout condition to a signal from said receiver of a different predetermined frequency to maintain said circuit in a lockout condition.

References Cited in the file of this patent

UNITED STATES PATENTS

| | | |
|---|---|---|
| 1,809,945 | Rea | June 16, 1931 |
| 2,513,485 | Herrick | July 4, 1950 |
| 2,639,373 | Goodrich | May 19, 1953 |
| 2,653,228 | Pan | Sept. 22, 1953 |

FOREIGN PATENTS

| | | |
|---|---|---|
| 525,109 | Canada | May 15, 1956 |